United States Patent
Beutel et al.

[15] 3,674,859
[45] July 4, 1972

[54] AQUEOUS DOXYCYCLINE COMPOSITIONS

[72] Inventors: Rolf Ernst Beutel; Kathe Christel Lohlbach; Helmut Wilhelm Raaf, all of Karlsruhe, Germany

[73] Assignee: Pfizer Inc., New York, N.Y.

[22] Filed: June 25, 1969

[21] Appl. No.: 836,591

[30] Foreign Application Priority Data

June 28, 1968 Germany..................P 17 67 891.0

[52] U.S. Cl................................................424/80, 424/227
[51] Int. Cl. ..........................................A61k 21/00

[58] Field of Search............................................424/80, 227

[56] References Cited

UNITED STATES PATENTS 3,200,149  8/1965  Blackwood et al. ...................424/227

*Primary Examiner*—Sam Rosen
*Attorney*—Connolly & Hutz

[57] ABSTRACT

Aqueous doxycycline solutions suitable for pharmaceutical use contain polyvinylpyrrolidone and are especially useful for either oral, topical or parenteral administration.

9 Claims, No Drawings

AQUEOUS DOXYCYCLINE COMPOSITIONS

BACKGROUND OF THE INVENTION

This invention relates to new and useful aqueous antibiotic compositions suitable for pharmaceutical formulation. More particularly, it is concerned with novel doxycycline solutions in water which all contain polyvinylpyrrolidone and are of especial value for therapeutic administration.

In the past, various attempts have been made to obtain broad spectrum tetracycline-type antibiotics in solution form, including doxycycline. For instance, aqueous solutions of doxycycline could be prepared in the highly acid or alkaline pH range, but these solutions were not found to be suitable for parenteral administration due to their high degree of instability nor are they even tolerated topically. On the other hand, aqueous solutions of oxytetracycline have been obtained, which are found suitable for therapeutic administration, by simply dissolving the oxytetracycline in water containing polyvinylpyrrolidone together with an added magnesium compound at a pH range of 8.5–9.0 (e.g., see British Patent No. 1,131,007). Unfortunately, however, in attempting to extrapolate this method to doxycycline, one does not obtain a suitable aqueous solution.

SUMMARY OF THE INVENTION

In accordance with the present invention, it has now been surprisingly found that stable aqueous solutions of doxycycline are provided for the first time by means of a novel antibiotic pharmaceutical composition comprising a solution in water of an antibiotic compound selected from the group consisting of doxycycline and the pharmaceutically acceptable acid addition salts thereof, together with polyvinylpyrrolidone having an average molecular weight that is in the range of from about 10,000 to about 60,000, said solution having a pH value that is in the range of from about five to about eight. These particular solutions are all relatively very stable and topically well tolerated, as contrasted with prior art doxycycline solutions in the same pH range lacking the polyvinylpyrrolidone component. Accordingly, the aqueous antibiotic pharmaceutically compositions of this invention are especially useful for either oral, topical or parenteral administration.

DETAILED DESCRIPTION OF THE INVENTION

In accordance with the process employed for preparing the novel compositions of this invention, doxycycline, either in the form of the free base or as a pharmaceutically acceptable acid addition salt, is mixed with polyvinyl-pyrrolidone in water and the pH of the resulting aqueous suspension is adjusted, if need be, to a value in the pH range of from about five to about eight using a suitable organic acid or base. The two solid ingredients can be mixed in powder form first and then dissolved in water shortly before administration, or a stable aqueous solution suitable for injection can be prepared and kept in stock until ready for use. In the latter case, it is sometimes found advantageous to add a soluble magnesium compound to the system so as to provide a readily available source of magnesium ions in the aqueous composition. Suitable magnesium compounds useful for these purposes include pharmaceutically acceptable magnesium compounds such as magnesium oxide, magnesium chloride, magnesium ascorbate, magnesium lactate, magnesium gluconate, etc. The molar ratio of magnesium to doxycycline in these compositions is one that is in the range of from about 0.5:1.0 to about 5.0:1.0, respectively, with the preferred ratio being about 2:1.

Needless to say, if the doxycycline antibiotic component is used in the form of one of its acid addition salts as indicated above, the pH value of the resulting aqueous system is advantageously adjusted with a physiologically acceptable base in order to effect complete solution of the entire system. Examples of suitable doxycycline acid addition salts which can be used for these purposes include such parmaceutically acceptable acid addition salts as the hydrochloride, hydrobromide, sulfate, nitrate, ascorbate, citrate, gluconate, lactate, isonicotinate, gentisinate, pantothenate, salicylate, glucuronate, formate and glutamate, etc. Preferred bases for adjusting the pH value, on the other hand, include such inorganic bases as ammonia and sodium hydroxide, as well as organic bases like tris-hydroxymethyl aminomethane, aminoethanol, dimethylaminomethanol, diethylaminoethanol, dimethylamine, diethylamine, trimethylamine, triethylamine and so forth. Of these compounds, tris-hydroxymethyl aminomethane is the most preferred member, since this particular organic base compound is especially suited for dealing with the previously mentioned dry mixture that is to be dissolved in water shortly before administration in solution form.

In most instances, however, when doxycycline is employed in the form of the free base in the compositions of this invention and even in some cases where a doxycycline salt and magnesium oxide are combined, the pH value is advantageously adjusted to the desired aforementioned pH range by means of an acid that is substantially non-toxic in nature like hydrochloric acid, hydrobromic acid, sulfuric acid, ascorbic acid, tartaric acid, lactic acid, formic acid, acetic acid, gluconic acid, glucuronic acid, gentisic acid, isonicotinic acid, glutamic acid, and so forth. Of these compounds, the organic acids are preferred and ascorbic acid is especially preferred, since it also serves to act as an anti-oxidant for the mixture. Nevertheless, there are some instances when dealing with doxycycline in the form of the free base where it is still necessary to adjust the pH of the resulting aqueous system with an inorganic or organic base, as indicated previously, and this would be the case when doxycycline base and magnesium chloride are combined.

The polyvinylpyrrolidone component present in these compositions has been used in the field of medicine in the past as a blood plasma extender so as to increase the volume of blood in treating shock. The particular polyvinylpyrrolidone required for this invention is a commercially available, low molecular weight polyvinylpyrrolidone having an average molecular weight that is in the range of from about 10,000 to about 60,000. Especially useful for parenteral administration purposes are aqueous solutions containing polyvinylpyrrolidone of average molecular weight about 13,000 as well as polyvinylpyrrolidone of average molecular weight about 10,000–12,000 (where K-value=17), although a preferred molecular weight range for the polyvinylpyrrolidone in the aqueous solutions of this invention would normally be from about 10,000 to about 17,000. In general, the concentration range for the polyvinylpyrrolidone in the aqueous solutions of this invention is from about 5 percent up to about 40 percent by weight of the total composition, with the preferred range being from about 10 percent to about 25 percent by weight of the total.

Doxycycline, the therapeutically-active component of the novel pharmaceutical compositions of this invention, is a tetracycline-type antibiotic of high potency with excellent absorption characteristics and a superior half-life. It is particularly described and claimed by R.K. Blackwood et al. in U.S. Pat. No. 3,200,149 under the chemical name, α-6-deoxy-5-oxytetracycline. An effective concentration range for doxycycline in the aqueous solutions of this invention is generally from about 1 percent to about 15 percent by weight of the total, although preferred concentrations will ordinarily range from about 2 percent to about 8 percent by weight of same. Under these conditions, the polyvinylpyrrolidone is present therein at a concentration level that is at least about twice that of the doxycycline antibiotic on a parts by weight basis.

As previously indicated, the stability of these aqueous solutions for therapeutic administration is still further enhanced by the use and/or addition of ascorbic acid to the system for anti-oxidant purposes. However, other reducing substances such as sodium metabisulfite, sodium sulfite and sodium formaldehyde sulfoxylate can also be used in this connection, if so desired, particularly when added to the system at concentration levels in the 0.1–1 percent weight range with respect to said solution.

A particularly preferred composition of this invention, therefore, comprises a solution in water of from about 2 percent to about 8 percent by weight of at least one antibiotic compound selected from the group consisting of doxycycline and the pharmaceutically acceptable acid addition salts thereof, from about 10 percent to about 25 percent by weight of polyvinylpyrrolidone having an average molecular weight that is in the range of from about 10,000 to about 17,000, and a pharmaceutically acceptable magnesium compound selected from the group consisting of magnesium oxide, magnesium chloride and magnesium gluconate whereby the molar ratio of magnesium to doxycycline in the mixture is about 2:1, and sufficient water to total 100 percent, said composition having a pH value in the range of from about five to about eight.

EXAMPLE I

A dry solid pharmaceutical composition was prepared by intimately admixing 0.200 g. of doxycycline hydrochloride with 0.120 g. of ascorbic acid, 1.400 g. of polyvinylpyrrolidone (K–value = 17) and 0.320 g. of tris-hydroxymethyl aminomethane. The blended powder thus obtained was then dissolved in water and brought to a total volume of 10 ml. shortly before use as a liquid doxycycline dosage form. The resulting solution was found to have a pH value of 7.8 and is suitable for either oral or topical administration.

Alternatively, the same composition was also prepared by adding the polyvinylpyrrolidone component to the dry mixture via the aqueous solvent system.

EXAMPLE II

A dry solid pharmaceutical composition was prepared by intimately blending 0.216 g. of doxycycline hydrochloride together with 1.400 g. of polyvinylpyrrolidone (K–value = 17) and 0.120 g. of tris-hydroxymethyl aminomethane. In a separate solvent ampoule, there was then placed an aqueous solution consisting of 0.185 g. of magnesium chloride hexahydrate dissolved in 8.5 ml. of water. Shortly before use, the dry and liquid components were mixed together to afford an aqueous doxycycline solution having a pH value of 5.5.

EXAMPLE III

A solution consisting of 0.185 g. of magnesium chloride hexahydrate dissolved in 5.0 g. of 30 percent aqueous polyvinylpyrrolidone (of average molecular weight about 13,000) was prepared. To this solution, there was then added 0.200 g. of doxycycline base and the resulting suspension was adjusted to a pH value of 5–6 with 2-aminoethanol. At this point, complete solution was effected and the product was brought to a total volume of 10 ml. with water. The final doxycycline solution was found to have a pH value of 5.5.

EXAMPLE IV

A mixture of 0.287 g. of doxycycline glucuronate and 0.0363 g. of magnesium oxide in 3.34 g. of 30 percent aqueous polyvinylpyrrolidone (K–value=17) was prepared. The resulting suspension was then adjusted to pH 5.4–5.6 with 0.175 g. of glucuronic acid, which was added slowly in small portions. At this point, complete solution was effected and the product was brought to a total volume of 5.0 ml. with water. The polyvinylpyrrolidone concentration in the final solution is 20 percent.

EXAMPLE V

A mixture of 0.288 g. of doxycycline gluconate and 0.0363 g. of magnesium oxide in 3.34 g. of 30 percent aqueous polyvinylpyrrolidone (K–value=17) was prepared. The resulting suspension was then adjusted to pH 5.5–5.7 by the slow addition of approximately 3.6 g. of 49 percent aqueous gluconic acid solution thereto. At this point, complete solution was effected and the product was brought to a total volume of 10 ml. with water.

EXAMPLE VI

A mixture of 0.279 g. of doxycycline ascorbate and 0.0363 g. of magnesium oxide in 3.34 g. of 30 percent aqueous polyvinylpyrrolidone (K–value=17) was prepared. The resulting suspension was then adjusted to pH 5.4–5.6 with 0.158 g. of ascorbic acid. At this point, complete solution was effected and the product was brought to a total volume of 5.0 ml. with water.

EXAMPLE VII

A mixture of 0.269 g. of doxycycline gentisinate and 0.363 g. of magnesium oxide in 3.34 g. of 30 percent aqueous polyvinylpyrrolidone (K–value=17) was prepared. The resulting suspension was then adjusted to pH 5.2–5.4 with 0.138 g. of gentisic acid. At this point, complete solution was effected and the product was brought to a total volume of 5.0 ml. with water.

EXAMPLE VIII

A mixture of 0.216 g. of doxycycline hydrochloride and 0.183 g. of magnesium chloride hexahydrate in 2.17 g. of 20 percent aqueous polyvinylpyrrolidone (K–value=17) was prepared. The resulting suspension was then gradually adjusted to pH 5.4–5.6 with approximately 0.06 g. of monoethanolamine. At this point, complete solution was effected and the product was subsequently treated with 0.02 g. of sodium formaldehyde sulfoxylate and brought to a total volume of 3.0 ml. with water.

This particular aqueous doxycycline solution is found especially suitable for intramuscular administration upon the immediate addition thereto of 2 percent by weight of N,N-diethylamino-2,6-dimethylacetanilide.

EXAMPLE IX

A mixture of 0.240 g. of doxycycline lactate and 0.0363 g. of magnesium oxide in 3.34 g. of 30 percent aqueous polyvinylpyrrolidone (K–value=17) was prepared. The resulting suspension was then slowly adjusted to pH 5.0 with 0.137 g. of 90 percent aqueous lactic acid. At this point, complete solution was effected and the product was brought to a total volume of 5.0 ml. with water.

EXAMPLE X

A mixture of 0.200 g. of doxycycline base and 0.389 g. of magnesium gluconate in 3.34 g. of 30 percent aqueous polyvinylpyrrolidone (K–value=17) was prepared. The resulting aqueous suspension was then slowly adjusted to pH 5.6–5.8 with monoethanolamine. At this point, complete solution was effected and the product was subsequently treated with 0.02 g. of sodium metabisulfite and brought to a total volume of 5.0 ml. with water.

EXAMPLE XI

A dry solid pharmaceutical composition was prepared by intimately admixing 0.217 g. of doxycycline hydrochloride with 0.389 g. of magnesium gluconate, 1.400 g. of polyvinylpyrrolidone (K–value=17), 0.123 g. of tris-hydroxymethyl aminomethane and 0.02 g. of sodium metabisulfite. The blended powder thus obtained was then dissolved in water and brought to a total volume of 10 ml., using sterile pyrogen-free water for injection purposes. The resulting solution was found to have a pH value in the range of 5.5–5.6 and is immediately available for use as a parenteral doxycyclic dosage form.

Alternatively, the same composition was also prepared by adding the polyvinylpyrrolidone and sodium metabisulfite components to the mixture via the aforementioned aqueous solvent medium.

EXAMPLE XII

A mixture of 0.220 g. of doxycycline formate and 0.0363 g. of magnesium oxide in 3.34 g. of 30 percent aqueous polyvinylpyrrolidone (K–value=17) was prepared. The resulting suspension was then adjusted to pH 5.1–5.2 with 0.042 g. of formic acid. At this point, complete solution was effected and the product was brought to a total volume of 5.0 ml. with water.

EXAMPLE XIII

A mixture of 0.255 g. of doxycycline isonicotinate and 0.0363 g. of magnesium oxide in 3.34 g. of 30 percent aqueous polyvinylpyrrolidone (K–value=17) was prepared. The resulting suspension was then adjusted to pH 5.7–5.9 with 0.111 g. of isonicotinic acid. At this point, complete solution was effected and the product was brought to a total volume of 5.0 ml. with water.

EXAMPLE XIV

A mixture of 0.266 g. of doxycycline glutamate and 0.0363 g. of magnesium oxide in 3.34 g. of 30 percent aqueous polyvinylpyrrolidone (K–value=17) was prepared. The resulting suspension was then adjusted to pH 5.6–5.8 with glutamic acid. At this point, complete solution was effected and the product was brought to a total volume of 5.0 ml. with water.

EXAMPLE XV

A solution consisting of 0.183 g. of magnesium chloride hexahydrate dissolved in 3.34 g. of 30 percent aqueous polyvinylpyrrolidone (K–value=17) was prepared. To this solution, there was then added 0.200 g. of doxycycline base and the resulting suspension was adjusted to a pH value of 5–6 by the addition of monoethanolamine. At this point, complete solution was effected and the product was brought to a total volume of 5.0 ml. with water.

EXAMPLE XVI

A mixture of 0.200 g. of doxycycline base and 0.0363 g. of magnesium oxide in 3.34 g. of 30 percent aqueous polyvinylpyrrolidone (of average molecular weight about 13,000) was prepared. The resulting suspension was then adjusted to pH 5–6, using one of the organic acids previously employed for these purposes, as hereinbefore described in some of the preceding examples. At this point, complete solution was effected and the product was brought to a total volume of 5.0 ml. with water to afford the doxycycline-magnesium complex in a suitable liquid dosage form.

EXAMPLE XVII

A mixture of 0.054 g. of doxycycline hydrochloride and 0.0458 g. of magnesium chloride hexahydrate in five g. of 30 percent aqueous polyvinylpyrrolidone (K–value=17) was prepared. The resulting suspension was then adjusted to pH 5.5–5.7 with approximately 0.02 g. of monoethanolamine. At this point, complete solution was effected and the product was brought to a total volume of 10 ml. with water. This particular solution contains five mg. of doxycycline per ml. and is suitable for topical administration, particularly with respect to the eye and ear.

EXAMPLE XVIII

A mixture of 0.216 g. of doxycycline hydrochloride and 0.183 g. of magnesium chloride hexahydrate in 3.34 g. of 30 percent aqueous polyvinylpyrrolidone (K–value=17) was prepared. The resulting suspension was then adjusted to pH 5.5–5.7 with approximately 0.055 g. of monoethanolamine. At this point, complete solution was effected and the product was brought to a total volume of 5.0 ml. with water.

EXAMPLE XIX

The procedure described in the preceding examples is followed except that polyvinylpyrrolidone of average molecular weight about 60,000 is substituted for the lower molecular weight samples previously employed. In like manner, polyvinylpyrrolidone of average molecular weight about 10,000 is also used, as is polyvinylpyrrolidone of average molecular weight about 17,000. In each and every case, the results obtained are substantially the same as those reported previously in Examples I–XVIII.

EXAMPLE XX

The procedure described in the preceding examples is repeated except that polyvinylpyrrolidone is now employed at a 5 percent concentration level in the aqueous solution. In like manner, polyvinylpyrrolidone is also employed at levels as high as 40 percent by weight of the total composition, as well as at levels of 10 percent and 25 percent by weight, respectively. In each and every case, the results obtained are substantially the same as those reported previously in Examples I–XVIII.

EXAMPLE XXI

The procedure described in Examples I–II, VIII, XI and XVII–XVIII is repeated except that doxycycline hydrochloride is individually employed at concentration levels of 1 percent, 2 percent, 8 percent and 15 percent by weight of the total solution, respectively. In each and every case, the results obtained are substantially the same as those previously reported in the aforementioned examples.

EXAMPLE XXII

The procedure described in Examples III, X and XV–XVI is repeated using doxycycline base at concentration levels of 1 percent, 2 percent, 8 percent and 15 percent by weight of the total solution, respectively. In each and every case, the results obtained are substantially the same as those reported previously in each of the aforementioned examples.

EXAMPLE XXIII

The procedure described in Examples III and XV is repeated using magnesium chloride hexahydrate at the 0.046 g. and 0.460 g. levels, respectively. In each and every case, the results obtained are substantially the same as those reported previously in each of the aforementioned examples.

EXAMPLE XXIV

The procedure described in Example X is repeated using magnesium gluconate at levels of 0.097 g. and 0.970 g., respectively. In each and every case, the results obtained are substantially the same as those reported previously in the aforesaid example.

EXAMPLE XXV

The procedure described in Example XVI is repeated using magnesium oxide at levels of 0.0091 g. and 0.0910 g., respectively. In each and every case, the results obtained are substantially the same as those reported previously in the aforesaid example.

What is claimed is:

1. An aqueous pharmaceutical composition comprising a solution in water of from about 1 percent to about 15 percent by weight of at least one antibiotic compound selected from the group consisting of doxycycline and the pharmaceutically acceptable acid addition salts thereof, and from about 5 percent to about 40 percent by weight of polyvinylpyrrolidone having an average molecular weight that is in the range of from about 10,000 to about 60,000, said composition having a pH value in the range of from about five to about eight.

2. A composition as claimed in claim 1 wherein the polyvinylpyrrolidone concentration range is from about 10 percent to about 25 percent by weight of the total.

3. A composition as claimed in claim 1 wherein the polyvinylpyrrolidone has an average molecular weight that is in the range of from about 10,000 to about 17,000.

4. A composition as claimed in claim 1 wherein the doxycycline concentration range is from about 2 percent to about 8 percent by weight of the total.

5. An aqueous pharmaceutical composition comprising a solution in water of from about 1 percent to about 15 percent by weight of at least one antibiotic compound selected from the group consisting of doxycycline and the pharmaceutically acceptable acid addition salts thereof, a pharmaceutically acceptable magnesium compound soluble in said aqueous pharmaceutical composition, and from about 5 percent to about 40 percent by weight of a low molecular weight polyvinylpyrrolidone having an average molecular weight up to about 60,000, said composition having a pH value in the range of from about five to about eight, the molar ratio of magnesium to doxycycline being in the range of from about 0.5:1.0 to about 5.0:1.0, respectively.

6. A composition as claimed in claim 5 wherein the magnesium compound is magnesium oxide, magnesium chloride or magnesium gluconate.

7. A composition as claimed in claim 5 wherein the magnesium to doxycycline molar ratio is about 2:1.

8. A composition as claimed in claim 5 wherein the polyvinylpyrrolidone is present at a concentration level that is at least about twice that of the doxycycline antibiotic on a parts by weight basis.

9. An aqueous pharmaceutical composition comprising a solution in water of from about 2 percent to about 8 percent by weight of at least one antibiotic compound selected from the group consisting of doxycycline and the pharmaceutically acceptable acid addition salts thereof, from about 10 percent to about 25 percent by weight of polyvinylpyrrolidone having an average molecular weight that is in the range of from about 10,000 to about 17,000, and a pharmaceutically acceptable magnesium compound soluble in said aqueous pharmaceutical composition selected from the group consisting of magnesium oxide, magnesium chloride and magnesium gluconate whereby the molar ratio of magnesium to doxycycline in the mixture is about 2:1, and sufficient water to total 100 percent, said composition having a pH value in the range of from about five to about eight.

* * * * *